United States Patent
Al-Nahdi et al.

(10) Patent No.: US 10,571,604 B2
(45) Date of Patent: Feb. 25, 2020

(54) TWO DIMENSIONAL RESERVOIR PRESSURE ESTIMATION WITH INTEGRATED STATIC BOTTOM-HOLE PRESSURE SURVEY DATA AND SIMULATION MODELING

(71) Applicant: Saudi Arabian Oil Company, Dhahran (SA)

(72) Inventors: Umar A. Al-Nahdi, Dammam (SA); Ali A. Al-Turki, Dhahran (SA); Badr M. Al-Harbi, Dhahran (SA); Sami A. Al-Nuaim, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 425 days.

(21) Appl. No.: 15/146,323

(22) Filed: May 4, 2016

(65) Prior Publication Data

US 2016/0245953 A1 Aug. 25, 2016

Related U.S. Application Data

(63) Continuation-in-part of application No. 14/014,658, filed on Aug. 30, 2013, now Pat. No. 9,896,930.

(51) Int. Cl.
*G06F 17/50* (2006.01)
*G01V 99/00* (2009.01)
*E21B 47/06* (2012.01)

(52) U.S. Cl.
CPC ............ *G01V 99/005* (2013.01); *E21B 47/06* (2013.01)

(58) Field of Classification Search
CPC ........ G01V 99/005; E21B 47/00; E21B 47/06
USPC .......................................................... 703/2
See application file for complete search history.

(56) References Cited

U.S. PATENT DOCUMENTS

| | | | |
|---|---|---|---|
| 3,303,704 A | 2/1967 | Brown et al. | |
| 7,526,418 B2 | 4/2009 | Pita et al. | |
| 8,078,328 B2 | 12/2011 | Malki et al. | |
| 8,312,320 B2 | 11/2012 | Almadi et al. | |
| 8,335,677 B2 | 12/2012 | Yeten et al. | |
| 2006/0047489 A1 | 3/2006 | Scheidt et al. | |
| 2006/0069511 A1* | 3/2006 | Thambynayagam .. | G01V 99/00 702/12 |
| 2007/0016389 A1* | 1/2007 | Ozgen ..................... | E21B 47/00 703/10 |

(Continued)

OTHER PUBLICATIONS

International Search Report and Written Opinion for related PCT application PCT/US2014/049336 dated Sep. 24, 2015.
Dogru et al., "A Next-Generation Parallel Reservoir Simulator for Giant Reservoirs", SPE Reservoir Simulation Symposium held in the Woodlands, Texas USA, Feb. 3-4, 2009, pp. 1-29, SPE 119272.
Dogru et al., "New Frontiers in Large Scale Reservoir Simulation", SPE Reservoir Simulation Symposium held in The Woodlands Texas USA, Feb. 21-23, 2011, pp. 1-12, SPE 142297.

(Continued)

*Primary Examiner* — Dwin M Craig
(74) *Attorney, Agent, or Firm* — Bracewell LLP; Constance G. Rhebergen; Albert B. Kimball, Jr.

(57) ABSTRACT

Estimates are formed of reservoir pressure between the wells for subsurface hydrocarbon producing reservoir. The estimation is based on field data and physical laws governing the hydrocarbon flow in porous media. Information from 3-dimensional fine geological and numerical reservoir simulation models, statistical interpolation between the wells, and static bottom-hole pressure (SBHP) surveys (measurement) at wells are used to more rapidly determine 2-dimensional isobaric reservoir pressure maps for times of interest during the reservoir simulation.

9 Claims, 11 Drawing Sheets

(56) References Cited

U.S. PATENT DOCUMENTS

| | | | |
|---|---|---|---|
| 2009/0119082 A1* | 5/2009 | Fitzpatrick | E21B 49/00 703/10 |
| 2009/0276100 A1 | 11/2009 | Malki et al. | |
| 2009/0276156 A1 | 11/2009 | Kragas et al. | |
| 2010/0121623 A1 | 5/2010 | Yogeswaren | |
| 2011/0040536 A1 | 2/2011 | Levitan | |
| 2011/0060572 A1 | 3/2011 | Brown et al. | |
| 2011/0264430 A1 | 10/2011 | Tapscott et al. | |
| 2012/0109597 A1 | 5/2012 | Derfoul et al. | |
| 2012/0179436 A1 | 7/2012 | Fung | |
| 2012/0232865 A1* | 9/2012 | Maucec | G01V 1/30 703/2 |
| 2015/0066373 A1 | 3/2015 | Al-Nahdi et al. | |

OTHER PUBLICATIONS

DW Peaceman, "Interpretation of Well-Block Pressures in Numerical Reservoir Simulation With Nonsquare Grid Blocks and Anisotropic Permeability", Society of Petroleum Engineers Journal, 1983, pp. 531-543, Society of Petroleum Engineers of AIME.

DW Peaceman, "Interpretation of Well-Block Pressures in Numerical Reservoir Simulation", Society of Petroleum Engineers Journal, 1978, pp. 1-17, Society of Petroleum Engineers of AIME.

Foo, "A New Method of Calculating Reservoir Pressure in Real Time", SPE Gas Technology Symposium held in Canada, 2002, pp. 1-8, Society of Petroleum Engineers, SPE 75527.

International Search Report and Written Opinion dated Sep. 20, 2017 of PCT/US2017/030347.

Coats, K. "Reservoir Simulation" Petroleum Engineering Handbook; Chapter 48; 1987; pp. 1-20.

* cited by examiner $$
\left.\begin{array}{cccccc}
I_s & I_s & J_s & J_e & K_s & K_e \\
I_e & I_e & J_s & J_e & K_s & K_e \\
I_s & I_e & J_s & J_s & K_s & K_e \\
I_s & I_e & J_e & J_e & K_s & K_e
\end{array}\right\}
$$

TWO DIMENSIONAL RESERVOIR PRESSURE ESTIMATION WITH INTEGRATED STATIC BOTTOM-HOLE PRESSURE SURVEY DATA AND SIMULATION MODELING

CROSS-REFERENCE TO RELATED APPLICATIONS

The present application is a continuation in part of, and claims priority to, Applicants' co-pending, commonly owned U.S. patent application Ser. No. 14/014,658, filed Aug. 30, 2013, now issued as U.S. Pat. No. 9,896,930 on Feb. 20, 2018 which is incorporated herein by reference.

BACKGROUND OF THE INVENTION

1. Field of the Invention

The present invention relates to determination or mapping of reservoir pressure over a region of interest in a subsurface reservoir with integration of static bottom-hole pressure survey data and simulation modeling.

2. Description of the Related Art

In the oil and gas industries, massive amounts of data are required to be processed for computerized simulation, modeling and analysis for exploration and production purposes. For example, the development of underground hydrocarbon reservoirs typically includes development and analysis of computer simulation models of the reservoir. These underground hydrocarbon reservoirs are typically complex rock formations which contain both a petroleum fluid mixture and water. The reservoir fluid content usually exists in two or more fluid phases. The petroleum mixture in reservoir fluids is produced by wells drilled into and completed in these rock formations.

A computer reservoir model with realistic geological features and properties, appropriate distribution of in-situ fluids, as well as initial pressure conditions of the fluids also help in forecasting the optimal future oil and gas recovery from hydrocarbon reservoirs. Oil and gas companies have come to depend on such models as an important tool to enhance the ability to exploit a petroleum reserve.

It is desirable to be able to monitor pressure conditions in such a reservoir so that production is optimized. Adjustments can be made in production or injection rates to remove undesirable high or low pressure regions that might be observed from such monitoring. For reservoir planning purposes, the reservoir is simulated in a computer and runs are made of estimated production for a range of times over the projected life of the reservoir.

In simulation models, the reservoir is organized into a number of individual cells. Seismic data with increasing accuracy has permitted the cells to be on the order of 25 meters areal (x and y axis) intervals. For what are known as giant reservoirs, the number of cells is at least hundreds of millions, and reservoirs of what is known as giga-cell size (a billion cells or more) are encountered.

An example reservoir of the type for which production data are simulated over the expected reservoir life as illustrated by the model M (FIG. 1) is usually one which is known to those in the art as a giant reservoir. A giant reservoir may be several miles in length, breadth and depth in its extent beneath the earth and might, for example, have a volume or size on the order of three hundred billion cubic feet.

The reservoir is organized into a matrix which corresponds to the three dimensional extent of the reservoir and is composed of a number of contiguous 3-dimensional cells. It is common for a reservoir matrix to contain millions of cells to obtain as accurate an indication of reservoir conditions as feasible. Actual reservoir models may have several millions of such cells.

For reservoirs of this type, the actual number of wells may also be on the order of a thousand, with each well having a number of perforations into producing formations. Typically, not all of the wells in a reservoir have what are known as permanent downhole pressure gauges in them to monitor reservoir at those locations. This however represents a pressure measurement at only one point in the huge volume of the reservoir.

Thus, only a relatively small number of wells in a reservoir have such pressure gauges and as mentioned, the reservoir may have a substantial extent in terms of subsurface breadth, width and depth, leading to a very large number of cells in the model. The data points are extremely scarce when compared to the reservoir volume.

Therefore, the conditions and spatial quantity under which the actual well pressure is measured are completely different than the reservoir pressure which reservoir engineers are interested in for reservoir production optimization. Pressure measurements at the limited number of wells having gauges in the reservoir do not provide an accurate indication of reservoir pressure conditions of interest over the full 3-dimensional extent of the reservoir.

So far as is known, in previous isobaric mapping techniques, the well's static bottom-hole pressure (SBHP) readings were used to generate isobaric maps. Each SBHP reading was a control point based on which the isobaric map was generated. The interpolation between the control points was a simple linear interpolation that did not account for geological features or for reservoir dynamics during production.

SUMMARY OF THE INVENTION

Briefly, the present invention provides a new and improved computer implemented method of forming a two-dimensional pressure map with a data processing system of reservoir pressures in a region of interest in a subsurface hydrocarbon producing reservoir partitioned for modeling purposes into a reservoir model partitioned as an array of a grid of cells extending over the three dimensions of the reservoir, the reservoir having a plurality of wells with perforations for fluid passage from the reservoir into the wells, with selected ones of the wells having downhole pressure measurement systems installed therein, the array of a grid of cells of the reservoir model comprising well cells at the locations of the wells and reservoir cells at the remaining cells of the grid.

The computer processing receives pressure data from the wells based on measurements from the downhole pressure measurement systems, and performs simulated pressure calculations on a reservoir simulator in the data processing system for the cells in an array of well cells for an area of interest of the reservoir. Well cells at an uppermost perforation of each of the wells are populated with assigned pressure values from the received pressure data. Pressure values are propagated for the well cells of the wells below the uppermost perforations and for the reservoir cells of the area of interest to form a three-dimensional grid pressure array for the area of interest. The three-dimensional grid pressure array is then collapsed or transformed to a two-dimensional layer of pressure values for the region of interest. The two-dimensional layer of pressure values for the region of interest are assembled in memory of the data processing system and an output image map is formed of the two-dimensional layer of pressure values for the region of interest.

The present invention also provides a new and improved data processing system for forming a two-dimensional pressure map with a data processing system of reservoir pressures in a region of interest in a subsurface hydrocarbon producing reservoir partitioned for modeling purposes into a reservoir model partitioned as an array of a grid of cells extending over the three dimensions of the reservoir, the reservoir having a plurality of wells with perforations for fluid passage from the reservoir into the wells, with selected ones of the wells having downhole pressure measurement systems installed therein, the array of a grid of cells of the reservoir model comprising well cells at the locations of the wells and reservoir cells at the remaining cells of the grid.

The data processing system includes a processor which receives pressure data from the wells based on measurements from the downhole pressure measurement systems, and performs simulated pressure calculations on a reservoir simulator in the data processing system for the cells in an array of well cells for an area of interest of the reservoir. The processor then populates well cells at an uppermost perforation of each of the wells with assigned pressure values from the received pressure data, and propagates pressure values for the well cells of the wells below the uppermost perforations and to the reservoir cells of the area of interest to form a three-dimensional grid pressure array for the area of interest. The processor then reduces the three-dimensional grid pressure array to a two-dimensional layer of pressure values for the region of interest, and assembles in memory of the data processing system the measure of two-dimensional layer of pressure values of the region of interest. The data processing system also includes a memory storing the two-dimensional layer of pressure values for the region of interest an output display forming a display of the two-dimensional layer of pressure values for the region of interest of the reservoir.

The present invention also provides a new and improved data storage device which has stored in a computer readable medium non-transitory computer operable instructions for causing a data processing system to form a two-dimensional pressure map with a data processing system of reservoir pressures in a region of interest in a subsurface hydrocarbon producing reservoir partitioned for modeling purposes into a reservoir model partitioned as an array of a grid of cells extending over the three dimensions of the reservoir. The reservoir has a plurality of wells with perforations for fluid passage from the reservoir into the wells, with selected ones of the wells having downhole pressure measurement systems installed therein, the array of a grid of cells of the reservoir model comprising well cells at the locations of the wells and reservoir cells at the remaining cells of the grid.

The instructions stored in the data storage device cause the data processing system to receive pressure data from the wells based on measurements from the downhole pressure measurement systems, and perform simulated pressure calculations on a reservoir simulator in the data processing system for the cells in an array of well cells for an area of interest of the reservoir. The instructions also cause the data processing system to populate well cells at an uppermost perforation of each of the wells with assigned pressure values from the received pressure data, and then propagate pressure values for the well cells of the wells below the uppermost perforations and to the reservoir cells of the area of interest to form a three-dimensional grid pressure array for the area of interest. The instructions further cause the data processing system to reduce the three-dimensional grid pressure array to a two-dimensional layer of pressure values for the region of interest, and assemble in memory of the data processing system the two-dimensional layer of pressure values for the region of interest, then form an output image map of the two-dimensional layer of pressure values for the region of interest.

DETAILED DESCRIPTION OF THE PREFERRED EMBODIMENTS

Figure 1:
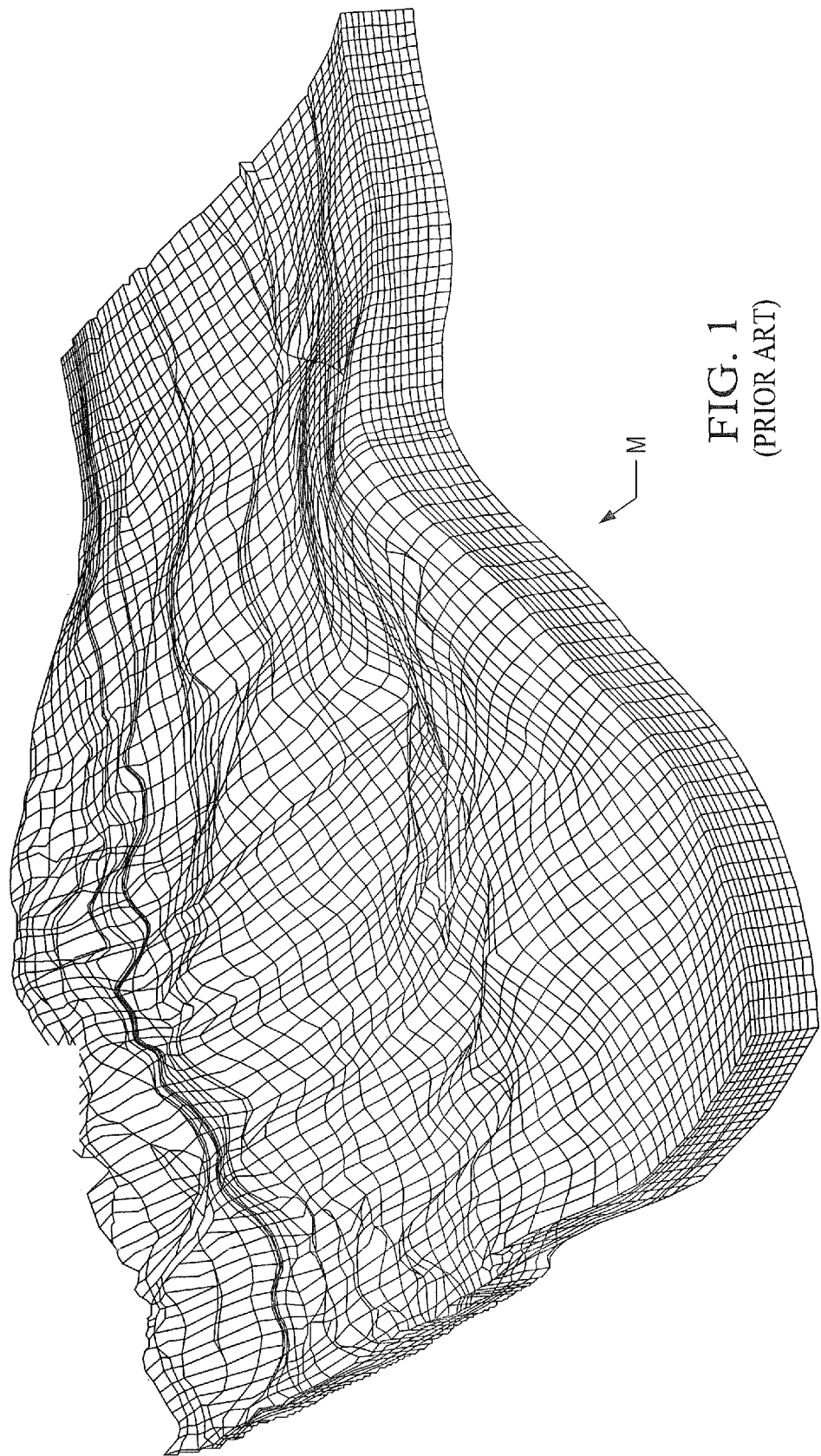
FIG. 1 is a schematic diagram of a model of a subsurface hydrocarbon reservoir.

In the drawings, the letter M designates a simplified model of a portion of a subsurface hydrocarbon reservoir for which production results based on operating conditions and parameters are simulated over an estimated production life according to the present invention based on geological and fluid characterization information obtained for the cells of the reservoir. The results obtained are thus available and used for simulation of historical performance and for forecasting of production from the reservoir. Based on the results of such simulation, models such as those described and shown in U.S. Pat. No. 7,526,418 are then formed and are available for evaluation and analysis. U.S. Pat. No. 7,526,418 is owned by the assignee of the present invention and is incorporated herein by reference.

For a giant reservoir, the physical size of the reservoir may be several miles in length, breadth and depth in its extent beneath the earth and might, for example, have a volume or size on the order of three hundred billion cubic feet. The number of cells for a reservoir of this size is, for example, typically on the order of hundreds of millions.

For reservoirs of this type, the actual number of wells may also be on the order of a thousand, with each well having a number of perforations into producing formations. Typically, a limited number of the wells in a reservoir have what are known as permanent downhole pressure gauges in them to monitor reservoir at those locations. This, however, represents a pressure measurement at only one point in the volume of the reservoir.

Thus, only key wells in a reservoir have such pressure gauges and as mentioned, the reservoir may have a substantial extent in terms of subsurface breadth, width and depth, leading to a very large number of cells in the model. The reservoir pressure data points are extremely scarce when compared to the reservoir volume.

Figure 2:
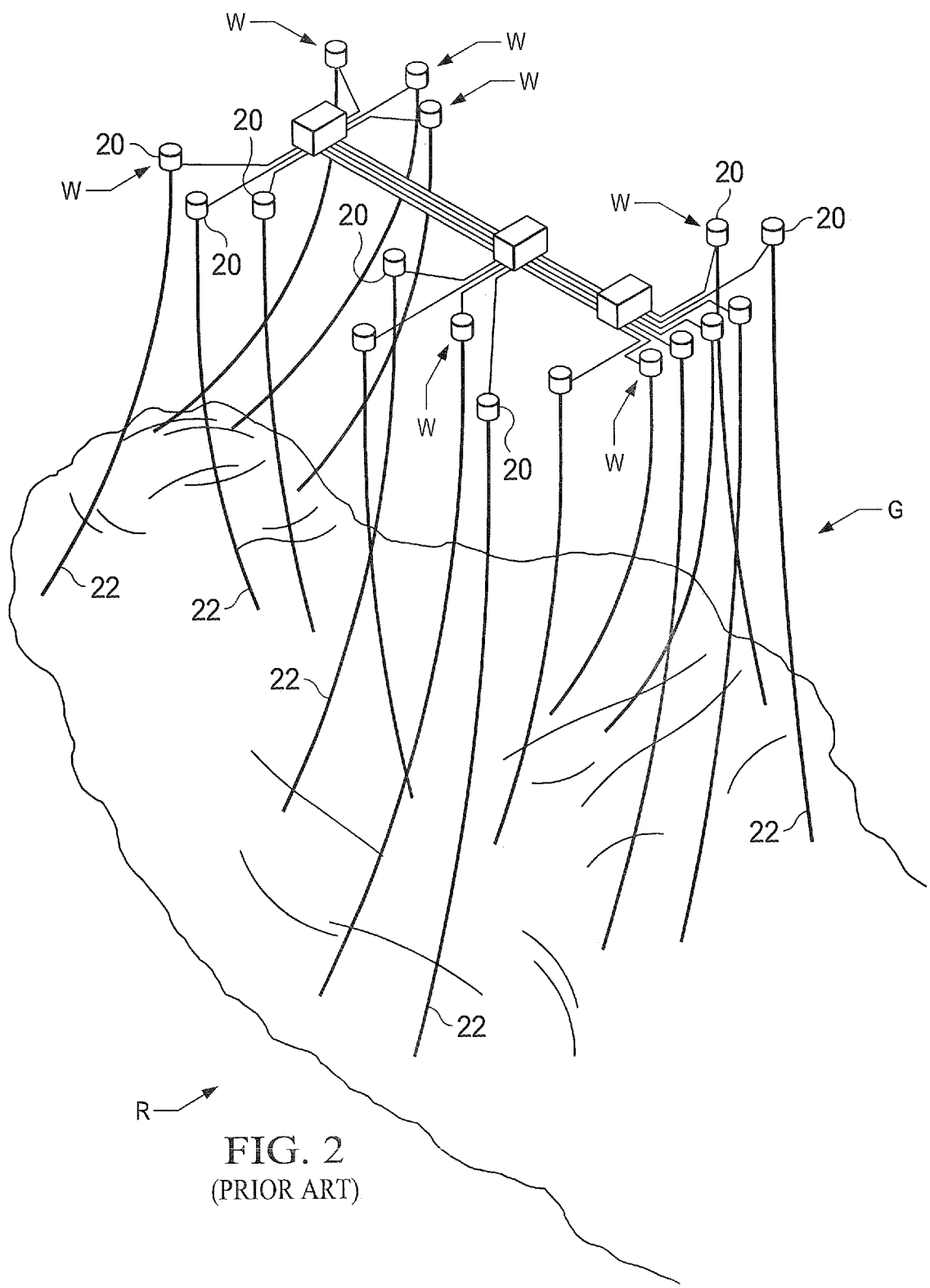
FIG. 2 is a schematic diagram showing a pressure downhole measuring system installed in a selected number of wells in the reservoir of FIG. 1.

FIG. 2 illustrates an example placement of a group G of wells W from a portion of a large reservoir R of the type and size exemplified by the model M of FIG. 1. The wells in the group G typically include production wells, injection wells and observation wells and are spaced over the extent of the reservoir. As indicated, certain ones of the wells W represented by the group G are provided with permanent downhole measurement systems 20, which are known as PDHMS. The PDHMS 20 may, for example be of the type described in U.S. Pat. Nos. 8,078,328 and 8,312,320, commonly owned by the assignee of the present application. The subject matter disclosed in U.S. Pat. Nos. 8,078,328 and 8,312,320 is incorporated herein by reference.

The PDHMS 20 include surface units which receive reservoir and well data in real time from downhole sensors 22. The downhole sensors 22 obtain data of interest, and for the purposes of the present invention the downhole sensors include downhole pressure and temperature sensors located in the wells W at selected depths and positions in the selected group G of wells among the much larger number of wells in the reservoir.

The downhole sensors 22 furnish the collected real-time pressure and temperature data from the wells W in which they are installed, and a supervisory control and data acquisition (SCADA) system with a host computer or data processing system D (FIG. 4) collects and organizes the collected data form the wells in the group G. The PDHMS 20 also includes sensors to record production and injection data for the injection wells in the group G, which data is also collected and organized by the supervisory control and data acquisition.

NOMENCLATURE

| | |
|---|---|
| $P_{av}$ | Average reservoir pressure |
| $P_{colav}$ | Average reservoir pressure for a column of grid blocks |
| $P_{SBHP}$ | Static Bottom-hole pressure |
| $\Delta P_{cf}$ | Pressure correction factor for a column of cells |
| $P_{cal}$ | i-Reservoir calculated pressure |
| $(PV_i)$ | Pore volume of cell or grid block i, where i = 1, 2 ... n |
| $(BV)_i$ | Bulk Volume of cell or grid block i, where i = 1, 2 ... n |
| $PV_i =$ | (Gridblock Bulk Volume) * porosity of grid block i where |
| $(BV)_i * \emptyset_i$ | i = 1, 2 ... n |
| $(S_w)_i$ | Water saturation |
| $(1 - S_w)_i$ | Hydrocarbon Saturation at grid block i where i = 1, 2 ... n |

-continued

| | |
|---|---|
| I | Grid block index in x-direction with reference to a layer in the 3D reservoir grid |
| J | Grid block index in y-direction with reference to a layer in the 3D reservoir grid |
| K | Grid block index in z-direction with reference to a column in the 3D reservoir grid |

SUBSCRIPTS

| | |
|---|---|
| C: | column |
| cf: | correction factor |
| cal: | calculated |
| colav: | column average |
| e: | grid block index |
| av: | average |
| i: | grid block index |
| s: | start |
| w: | water |
| HC: | hydrocarbon |
| avHC: | hydrocarbon weighted average |
| avWC: | average pressure above contacts (free phase table) |
| avHCWC: | hydrocarbon average above contacts (free phase table) |

Figure 3:
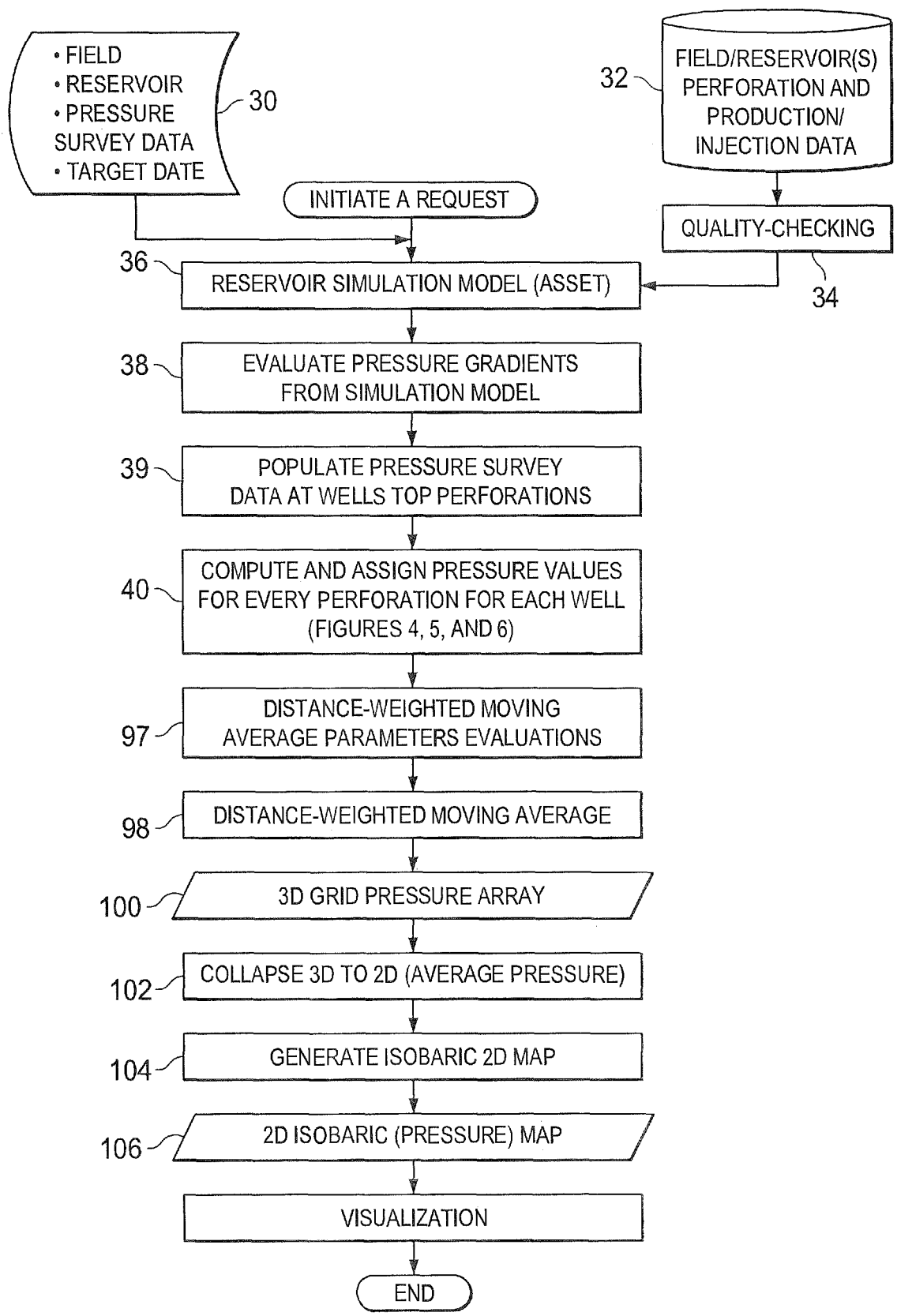
FIG. 3 is a functional block diagram of a set of data processing steps performed in a data processing system for two dimensional reservoir pressure estimation with integrated static bottom-hole pressure survey data and simulation modeling according to the present invention.

Turning to FIG. 3, a flow chart F displays a set of processor steps performed according to the methodology of the present invention in a data processing system D (FIG. 10) for three-dimensional reservoir pressure determination using real time pressure data from downhole gauges and reservoir simulation values determination to determine and form 2-dimensional isobaric pressure maps according to the present invention. The flowchart F indicates the basic computer processing sequence of the present invention and the computation taking place in the data processing system D for the 3-dimensional pressure determination reservoir simulation and map formation according to the present invention.

Processing according to the flow chart F of FIG. 3 is performed in conjunction with results of processing according to Applicant's co-pending, commonly owned U.S. patent application Ser. No. 14/014,658, filed Aug. 30, 2013, and in particular to the determination of an i-Reservoir calculated pressure $P_{cal}$ and the pressure gradients between cells of the reservoir model. In connection with the processing according to the flow chart F, certain input parameters are provided as indicated at step 30 by users interested in reservoir management according to the present invention. The input parameters are identifications of each of the following: Field, Reservoir(s), Pressure Survey Data (SBHP), and Target Date for which a two dimensional reservoir pressure estimation map is to be formed.

As shown at step 32, input perforation and production/injection data obtained by the reservoir simulator R in the data processing system D are also provided and subjected to quality checking as shown at step 34. The reservoir simulation model is thus updated with the latest perforations and production/injection data for the wells of interest in the reservoir or field.

The reservoir simulation is then performed by reservoir simulator R (FIG. 10) during step 36 with the quality-checked and verified updates to perforation and production/injection data which have been updated during step 34 to the date of interest. During step 36, pressure gradients between the reservoir model grid blocks or reservoir cells of the model M are determined according to the techniques of U.S. patent application Ser. No. 14/014,658, mentioned above.

The gradients between grid blocks are indicative of pressure changes in the reservoir due to geological heterogeneity, fluid dynamics, model constrains, and production/injection activities.

During step 38, the pressure gradients determined by reservoir simulator R as a result of step 36 are evaluated. In the evaluation during step 38, a perforation file of the reservoir data in the reservoir data is parsed and stored. The perforation file is also sorted by depth for each well in the reservoir. Pressure survey or SBHP survey data is also parsed and stored during step 38, as is needed data, which include samples of SBHP and of perforation data from the reservoir simulation model output. Inactive cells which are to be excluded from processing computation are then identified during step 38 and then discarded along with their data content.

In step 39, pressure survey data obtained from the reservoir in the manner described above as illustrated schematically in FIG. 2 is then used to determine reservoir pressure values at well top perforations of the wells 22 in the reservoir according to the techniques of U.S. patent application Ser. No. 14/014,658, mentioned above. Then, in step 40, pressure values are propagated for each of the perforations of each of the wells 22.

According to the present invention, there are three methods of performing step 40 for propagation of pressure values based on pressure survey data to be propagated to the perforations in the reservoir model and further to the reservoir models cells away from one or more of the wells. They are: an All Perforation Method as indicated schematically at 42 in FIG. 4; a Single Perforation Column Method shown schematically at 44 in FIG. 5; and an All-Perforation Column Method shown at 46 in FIG. 6.

All Perforation Method

Figure 4:
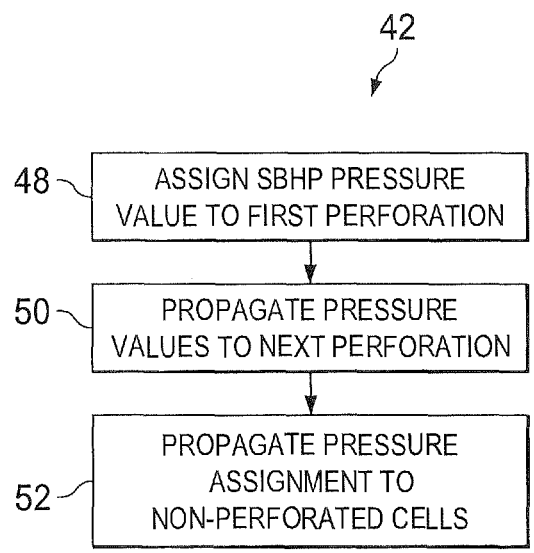
FIGS. 4, 5 and 6 are functional block diagrams of a set of data processing steps performed in connection with processing according to FIG. 3.

As shown in FIG. 4, the All Perforation processing 42 begins with step 48 where SBHP values are assigned to the first or uppermost perforation in a well. During step 50, measures from the simulation model of pressure gradient between the perforated cells are used to propagate pressure calculation successively from the first or uppermost cells to last lowest cells in the well. All perforations thus used are control points used in step 52 to propagate pressure assignments to non-perforated cells according to suitable statistical methods as describe in U.S. patent application Ser. No. 14/014,658. A suitable such method is that known as Distance-Weighted Moving Average or DWMA.

Figure 7A:
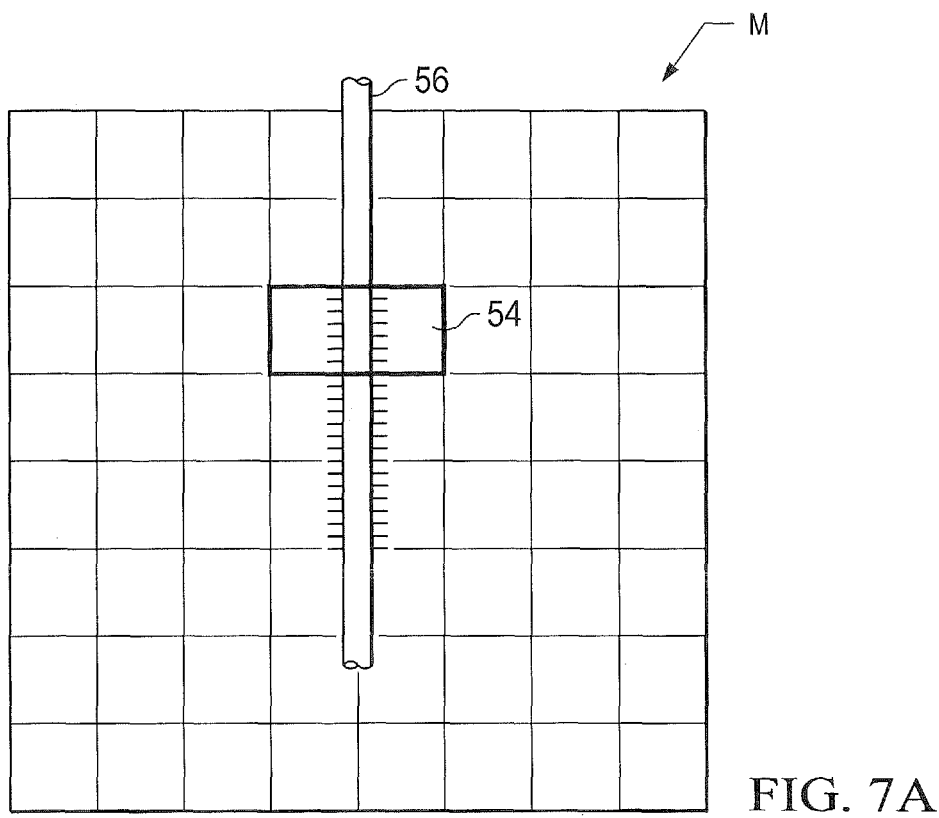
FIGS. 7A, 7B and 7C are schematic diagrams of grid cells of a subsurface reservoir model illustrative of the workflow according to FIGS. 3 and 4 for propagating pressure determinations to each perforation in a vertical well.
Figure 7B:
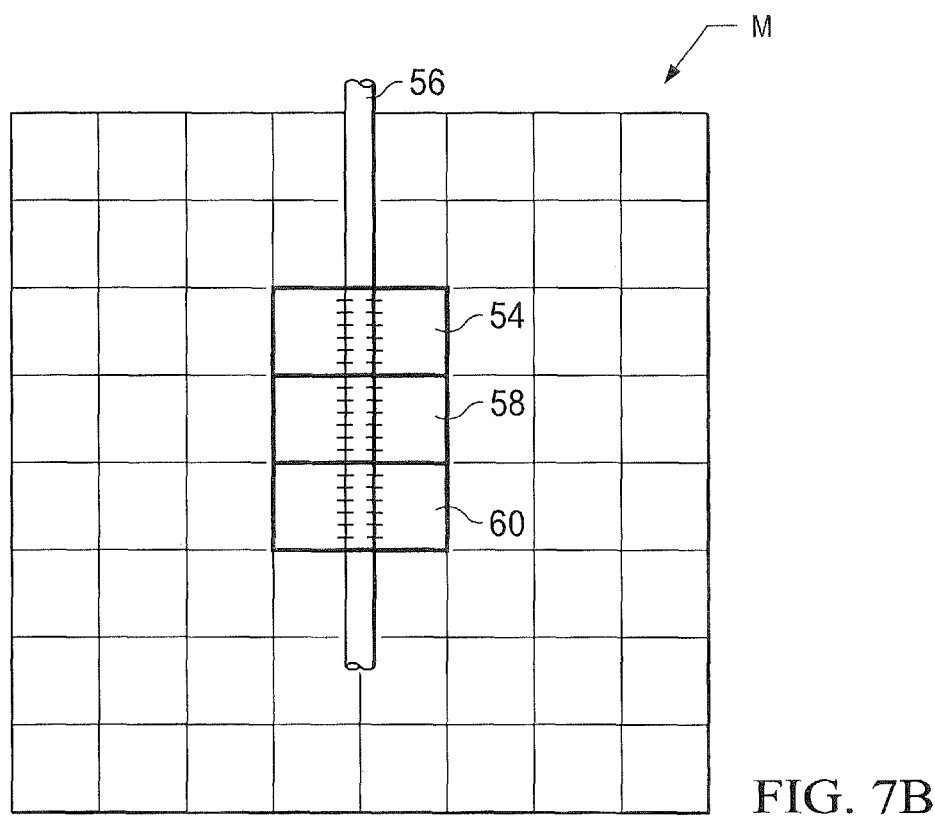
Figure 7C:
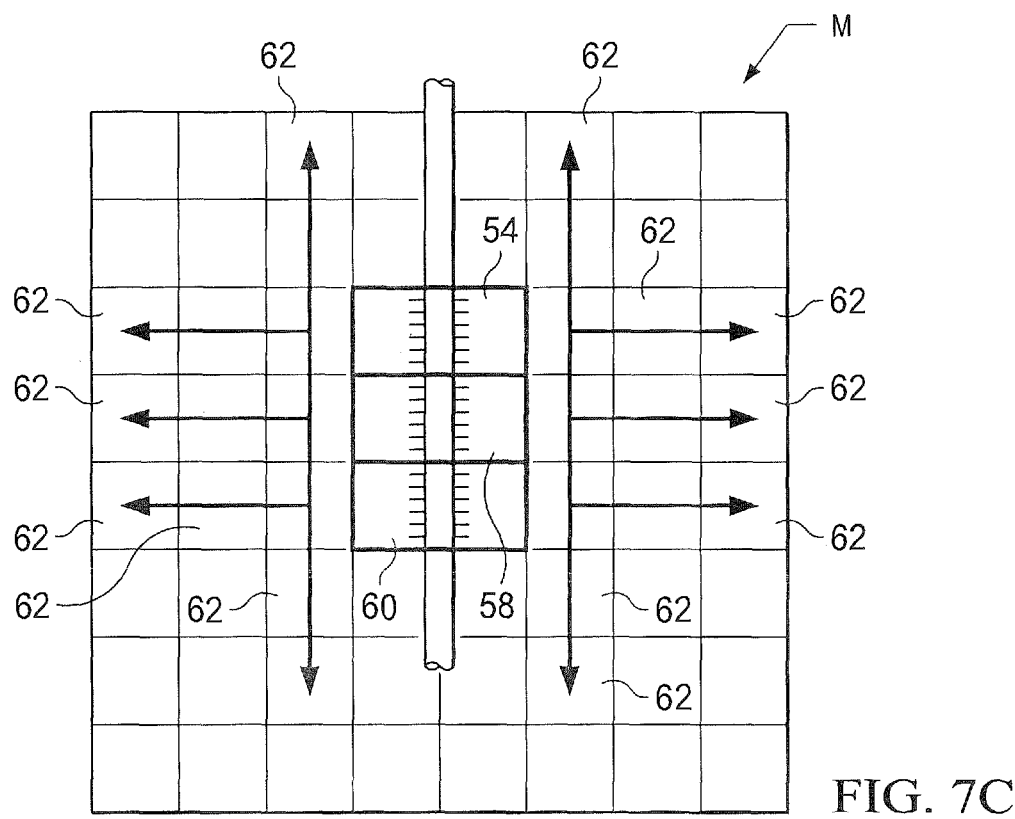

As shown schematically in FIG. 7A, during All Perforation processing step 42 SBHP values are assigned to the first or uppermost perforation 54 in an example vertical well 56. FIG. 7B illustrates schematically lower performance of step 52, where pressure gradient measures for reservoir simulation are successively propagated from perforation 54 successively to lower perforations 58 and 60. Since inactive cells have, as described above, been excluded from processing, perforations 54, 58 and 60 are shown vertically adjacent each other in FIGS. 7A, 7B and 7C. FIG. 7C illustrates schematically the assignment of pressure values to non-perforated cells 62 according to Distance-Weighted Moving Average or DWMA methods, as will be described.

Single-Perforation Column Method

Figure 5:
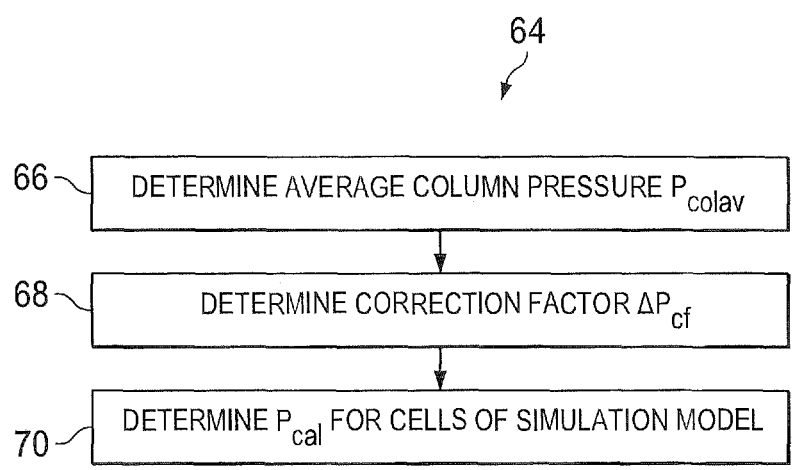

In the Single-Perforation Column Method shown at 64 (FIG. 5), only a first perforation of 56 well is considered as the pivot for calculating pressure along the well and away from it. As shown in FIG. 5, the All Perforation processing 64 begins with step 66 where after the first perforation is identified and the column of cells where, the first perforation is located is marked, the average column pressure ($P_{colav}$) is determined from the simulation model:

$$P_{colav} = \frac{\sum_{i=1}^{c}(P_i)}{c}$$

During step 68, a correction factor ($\Delta P_{cf}$) is determined by subtracting the pressure survey reading SBHP ($P_{SBHP}$) from the average column pressure $P_{sim}$) determined during step 66:

$$\Delta P_{cf} = P_{colav} - P_{SBHP}$$

During step 70, for each cell pressure value from simulation model, the correction factor ($\Delta P_{cf}$) is subtracted from cell pressure ($P_{sim}$) and the resultant i-Reservoir calculated pressure value $P_{cal}$ assigned to i-Reservoir grid pressure, as follows:

$$P_{cal} = P_{sim} - \Delta P_{cf}$$

Figure 8A:
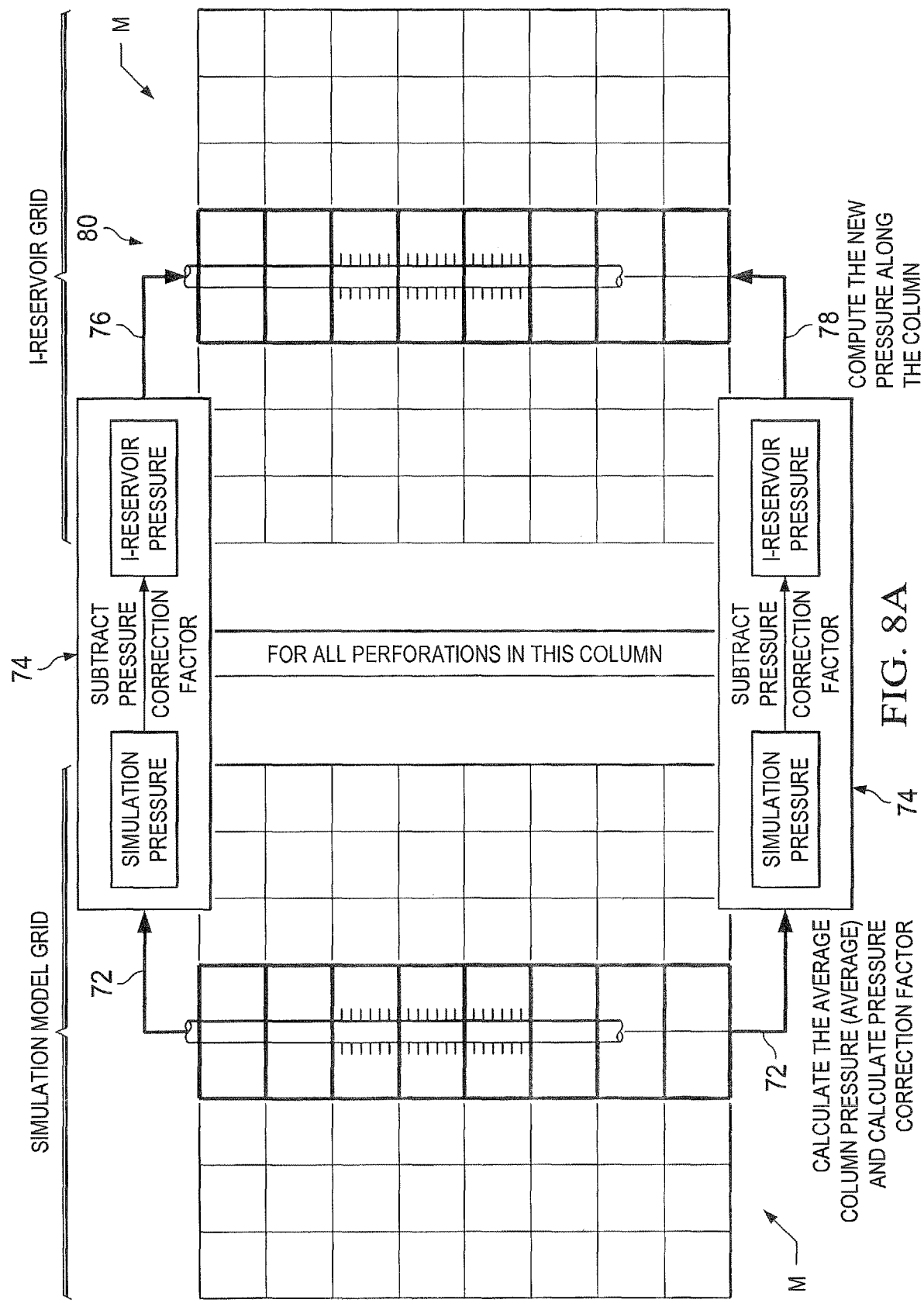
FIGS. 8A and 8B are schematic diagrams of grid cells of a subsurface reservoir model illustrative of the workflow according to FIGS. 3 and 5 for propagating pressure determinations for a single perforation in a vertical well to other grid cells in the reservoir.

In this manner pressure for each of the grid blocks is determined. FIG. 8A illustrates schematically the Single-Perforation Column Method step 64 where average column pressure measures as shown at 72 are determined and a pressure correction factor is subtracted as indicated at 74 resulting in an i-Reservoir pressure as shown at 76 and 78 for different cells in a column 80.

Figure 8B:
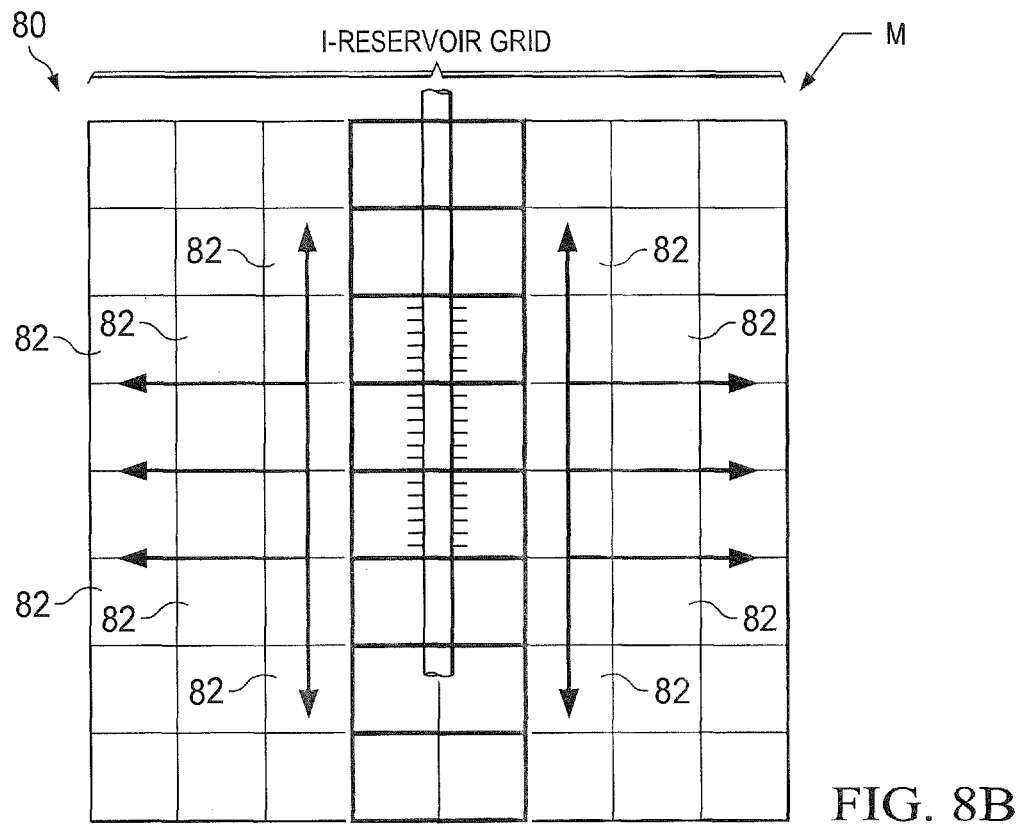

FIG. 8B illustrates schematically step 82 where the resultant i-Reservoir calculated pressure value $P_{cal}$ is determined for the cells 84 of the grid of the simulation model M. As a result, the average column pressure is the ($P_{SBHP}$).

All-Perforation Column Method

Figure 6:
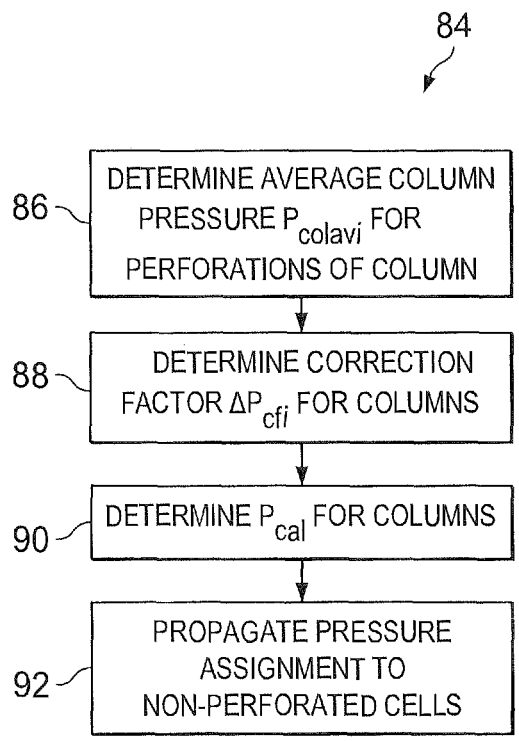

For the All-Perforation Column Method as shown at 84 (FIG. 6), each of the i perforations of a well are considered for calculating pressure along the well and away from it. The perforations of a well are identified, and measures of pressure along the perforations are determined according to the Single-Perforation Column Method described above. As shown in FIG. 6, the All Perforation processing begins with step 86, where the average column pressure ($P_{colav_i}$) is determined for the perforations of each column i from the simulation model:

$$(P_{colav_i}) = \frac{\sum_{i=1}^{c}(P_i)}{c}$$

During step 88, a correction factor ($\Delta P_{cf_i}$) is determined for each column i by subtracting the pressure survey reading SBHP ($P_{SBHP}$) from the average column pressure ($P_{colav_i}$) determined during step 86:

$$\Delta P_{cf_i} = P_{colav_i} - P_{SBHP}$$

Then, during step 90, for each column i and for each cell pressure value from simulation model in that column, the correction factor ($\Delta P_{cf_i}$) is subtracted from cell pressure ($P_{sim}$) and assigned as the pressure value $P_{cal}$ to i-Reservoir grid pressure:

$$P_{cal} = P_{sim} - \Delta P_{cf_i}$$

Next, in step 92, pressure assignments are determined and propagated to the remained or non-perforated grid blocks according to suitable statistical methods as described in U.S. patent application Ser. No. 14/014,658. For a vertical well, the All-Perforation Column Method produces the same results as the Single-Perforation Column Method, as illustrated schematically in FIGS. 8A and 8B and described above.

Figure 9:
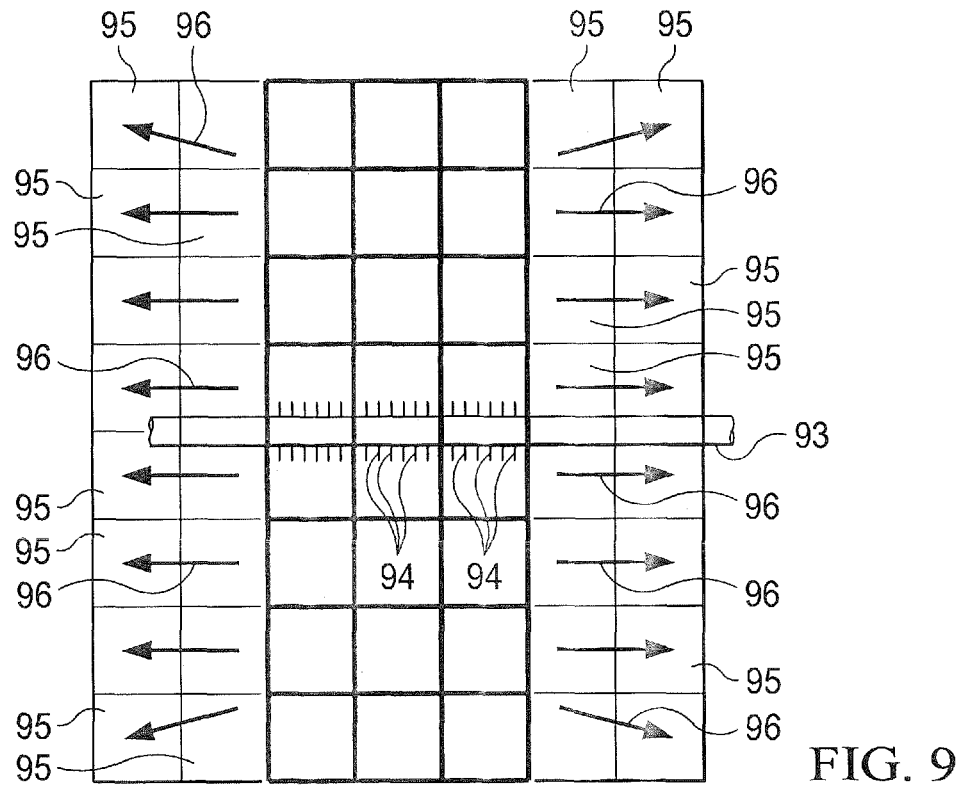
FIG. 9 is a schematic diagram of a subsurface reservoir model illustrative of the workflow according to FIGS. 3 and 6 for propagating pressure determinations for a single perforation in a horizontal well to other grid cells in the reservoir.

FIG. 9 illustrates schematically the All-Perforation Column Method step 84 (FIG. 6) for a horizontal well model 93 having a plurality of well perforations 94 as shown. In step 92 of the All-Perforation Column Method, pressure assignments are determined and propagated to the remained or non-perforated grid blocks 95 (FIG. 9) of the horizontal well model 93 according to suitable statistical methods as described in U.S. patent application Ser. No. 14/014,658, as indicated schematically at 96.

After performance of step 40 (FIG. 3) for pressure computation along the well completions of a selected one of the three alternatives: All Perforation Method; Single-Perforation Column Method or All-Perforation Column Method in the manner described above, the reservoir model has been adjusted. The reservoir model M indicates propagated pressure measures which incorporate measured reservoir pressures as adjusted to indicate the effects of physics and geology on the reservoir and its fluids indicated by reservoir simulation processing.

During step 97 (FIG. 3), a user is able to specify one of several techniques for data filtering, such as the type known as a Distance Weighted Moving Average or DWMA. The DWMA filtering is a nonlinear filter, designed to be a robust version of a traditional moving average. DWMA filtering is then performed during step 98 to reduce the impact of outlier propagated pressure measures in the reservoir model data. The result of step 98, as indicated at 100 is a 3-dimensional pressure array of reservoir pressure data which is stored for further processing by the data processing system D.

The 3-dimensional grid pressure array indicated at 100 is then in step 102 according to the present invention collapsed or changed in format from a 3-dimensional pressure array to 2-dimensional pressure of a region of interest (or entirety of the reservoir) in the reservoir M. There are a number of methods of collapsing the 3-dimensional grid to 2-dimensional maps, the simplest being simple averaging of the propagated pressure measures of the model adjacent the various specified map co-ordinates for 2-dimensional map being formed.

Preferably, however, one of several forms of Pore-Volume Weighted Averaging for step 102 is utilized for collapsing the 3-dimensional grid to a 2-dimensional map of the region of interest. Examples of such pore-volume weighted averaging to indicate average reservoir pressure for 2-dimensional isobaric maps are set forth below. Reference is made to the Nomenclature Section for an explanation of the physical measures indicated in the relationships of pore-volume weighted averaging expressed.

Pore-Volume Weighted Average Reservoir Pressure $$P_{av} = \frac{\sum_{i=1}^{n}(P_i(PV_i))}{\sum_{i=1}^{n}(PV_i)}$$

Hydrocarbon Pore-Volume Weighted Average Reservoir Pressure $$P_{avHC} = \frac{\sum_{i=1}^{n}(P_i[(PV)_i*(1-S_w)_i])}{\sum_{i=1}^{n}(PV)_i}$$

Pore-Volume Weighted Average Reservoir Pressure Above Free Water Table $$P_{avWC} = \frac{\sum_{i=1}^{n}(P_i(PV_i))}{\sum_{i=1}^{n}(PV_i)}$$

where i is the index of all grid block with depth greater than the specified contact's depth.

Hydrocarbon Pore-Volume Weighted Average Reservoir Pressure Above Free Water Table $$P_{avHCWC} = \frac{\sum_{i=1}^{n}(P_i[(PV)_i*(1-S_w)_i])}{\sum_{i=1}^{n}(PV)_i}$$

where i is the index of all grid block with depth greater than the specified contact's depth.

As mentioned a user engineer or analyst is able to select an area of interest in the reservoir model M for which an isobaric 2-dimensional pressure map is to be formed. The display is formed by the data processing system D during performance of step 104 of FIG. 3. For this processing step, an engineer can specify an area of interest using an n-sided polygon where all variety of isobaric maps can be generated as indicated at step 106 along with average reservoir pressure calculations.

Figure 12:
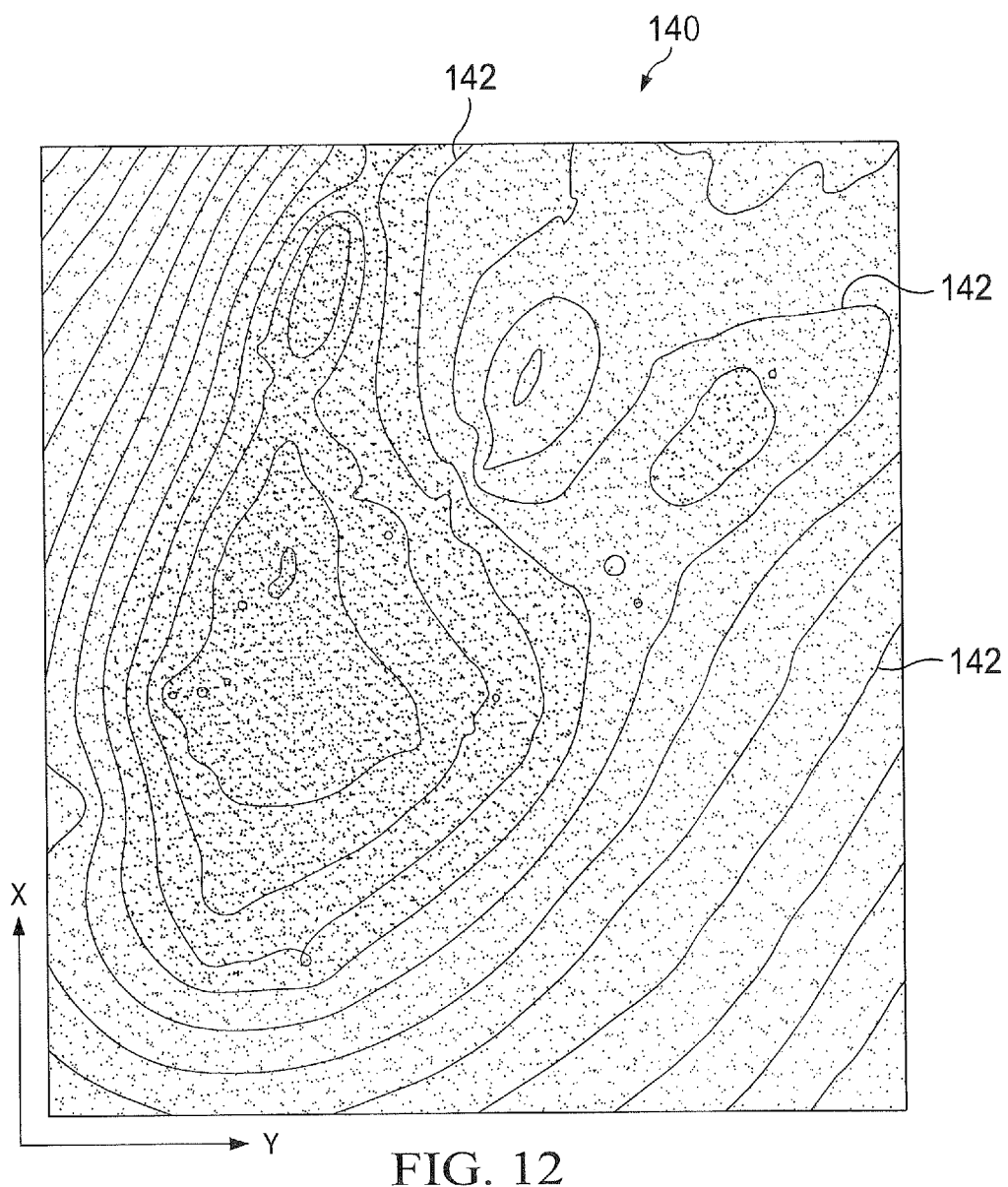
FIG. 12 is an example simulated plot of a 2-dimensional isobaric pressure map based on governing reservoir actual thermodynamics and geophysics relationships according to the present invention.

As shown in FIG. 12, an example plot 140 represents a simulated 2-dimensional isobaric pressure map which could be obtained according to the present invention based on governing equations and relationships for a selected area of interest, and representing the interplay of principles of thermodynamics and geophysics formed according to the present invention.

Example values of SBHP survey data and sample perforation location data according coordinates for perforations are set forth below:

| Sample SBHP Survey Data | | |
| --- | --- | --- |
| FIELD | WELL NO. | Oct. 1, 2015 |
| ABCD | 1 | 1500 |
| ABCD | 2 | 1300 |
| ABCD | 3 | 2000 |
| ABCD | 4 | 1655 |

-continued

Sample SBHP Survey Data

| FIELD | WELL NO. | Oct. 1, 2015 |
|---|---|---|
| ABCD | 5 | 1582 |
| ABCD | 6 | 1340 |
| ABCD | 7 | 1790 |
| ABCD | 8 | 2469 |
| ABCD | 9 | 4467 |
| ABCD | 10 | 1200 |
| ABCD | 11 | 1400 |
| ABCD | 12 | 4500 |
| ABCD | 13 | 3000 |
| ABCD | 14 | 1500 |
| ABCD | 15 | 4064 |
| ABCD | 16 | 3261 |
| ABCD | 17 | 2531 |
| ABCD | 18 | 5092 |
| ABCD | 19 | 2452 |
| ABCD | 20 | 2401 |
| ABCD | 21 | 2244 |
| ABCD | 22 | 2194 |

WELLS_BLOCK

WELL_Name=ABCD0001

PERF I=301 J=71 K=51 Rf=1.0 CD='Z'
Skin=1.0/MDEPTH=3873.5

PERF I=301 J=71 K=52 Rf=1.0 CD='Z'
Skin=2.0/MDEPTH=3880.5

PERF I=301 J=71 K=53 Rf=1.0 CD='Z'
Skin=1.0/MDEPTH=3887.5

PERF I=301 J=71 K=54 Rf=1.0 CD='Z'
Skin=0.0/MDEPTH=3898.5

PERF I=301 J=71 K=55 Rf=1.0 CD='Z'
Skin=0.0/MDEPTH=3913.5

PERF I=301 J=71 K=56 Rf=1.0 CD='Z'
Skin=0.0/MDEPTH=3928.5

PERF I=301 J=71 K=57 Rf=1.0 CD='Z'
Skin=1.0/MDEPTH=3941.5

WELL_Name=ABCD0002

PERF I=101 J=71 K=41 Rf=1.0 CD='Z'
Skin=0.0/MDEPTH=4873.0

PERF I=101 J=71 K=42 Rf=1.1 CD='Y'
Skin=0.0/MDEPTH=4880.0

PERF I=101 J=71 K=43 Rf=1.0 CD='Z'
Skin=0.0/MDEPTH=4887.0

PERF I=101 J=71 K=44 Rf=1.0 CD='Z'
Skin=0.0/MDEPTH=4898.0

PERF I=101 J=71 K=45 Rf=1.2 CD='Y'
Skin=0.0/MDEPTH=4913.0

PERF I=101 J=71 K=46 Rf=1.0 CD='Y'
Skin=0.0/MDEPTH=4928.0

PERF I=101 J=71 K=47 Rf=1.3 CD='Z'
Skin=0.0/MDEPTH=4941.0

ENDWELLS_BLOCK

DATE Dec. 1, 2010

WELLS_BLOCKS

WELL_Name=ABCD0005

PERF I=20 J=113 K=83 Rf=1.0 CD='Z'
Skin=0.0/MDEPTH=3890.50

PERF I=21 J=113 K=83 Rf=1.1 CD='X'
Skin=0.0/MDEPTH=3900.50

PERF I=21 J=113 K=84 Rf=1.0 CD='Z'
Skin=0.0/MDEPTH=3887.50

PERF I=22 J=113 K=81 Rf=1.0 CD='X'
Skin=3.0/MDEPTH=3887.50

PERF I=30 J=113 K=81 Rf=1.2 CD='X'
Skin=0.0/MDEPTH=3887.50

PERF I=31 J=113 K=83 Rf=1.0 CD='X'
Skin=0.0/MDEPTH=3887.50

PERF J=32 J=113 K=83 Rf=1.3 CD='Z'
Skin=0.0/MDEPTH=3890.50

ENDWELLS_BLOCK

As can be seen in FIG. 12, the map plot 140 indicates by x, y co-ordinates the location in a reservoir model M of a selected area of interest and by contour lines 142, areas of common isobaric pressures at the location. Indications of pressures represented as the 2-dimensional isobaric pressure areas in the reservoir map 140 may be indicated by variations in color, as schematically shown by varying stipple patterns in areas of common pressure within the contour lines. The pressures displayed indicate reservoir pressures over the area of interest while also taking into account geological features, aerial and vertical heterogeneity, and numerical model constraints. The maps formed according to the present invention are not merely estimates of reservoir pressures based only on readings from pressure measurement instrumentation located at a limited number of wells in a reservoir.

Figures 10A, 10B:
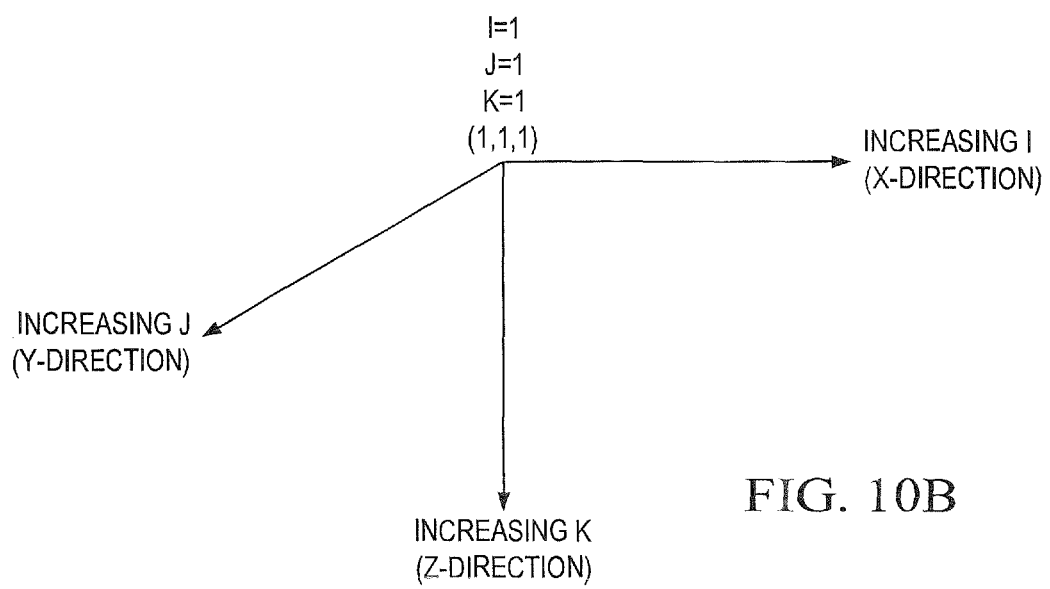
FIGS. 10A and 10B are schematic diagrams illustrating notations for directions and for grid nomenclature in a reservoir model.

FIG. 10A is a graphical depiction of an example specification of I, J, and K co-ordinates, having reference to FIG. 10B for the orientation of the axial disposition of the co-ordinates. Set forth below are examples of numerical dimensions.

Example 1

The area of interest, given model dimensions (I×J×K): 500×300×200, is bounded by 4-sided polygon indicated by these two corners (1, 1, 1) and (500, 300, 200) is basically the whole reservoir. Therefore the numerical co-ordinates of the user-specified region of interest in the reservoir model M are as set forth below in Table 1:

TABLE 1

| 1 | 1 | 1 | 300 | 1 | 200 |
| 500 | 500 | 1 | 300 | 1 | 200 |
| 1 | 500 | 1 | 1 | 1 | 200 |
| 1 | 500 | 300 | 300 | 1 | 200 |

Example 2

The area of interest, given model dimensions (I×J×K): 500×300×200 is bounded by corners (1, 50, 10) and (350, 100, 190). The numerical co-ordinates of the user-specified region of interest in the reservoir model M are as set forth below in Table 2:

TABLE 2

| 1 | 1 | 50 | 100 | 10 | 190 |
| 350 | 350 | 50 | 100 | 10 | 190 |
| 1 | 350 | 50 | 50 | 10 | 190 |
| 1 | 350 | 100 | 100 | 10 | 190 |

Figure 11:
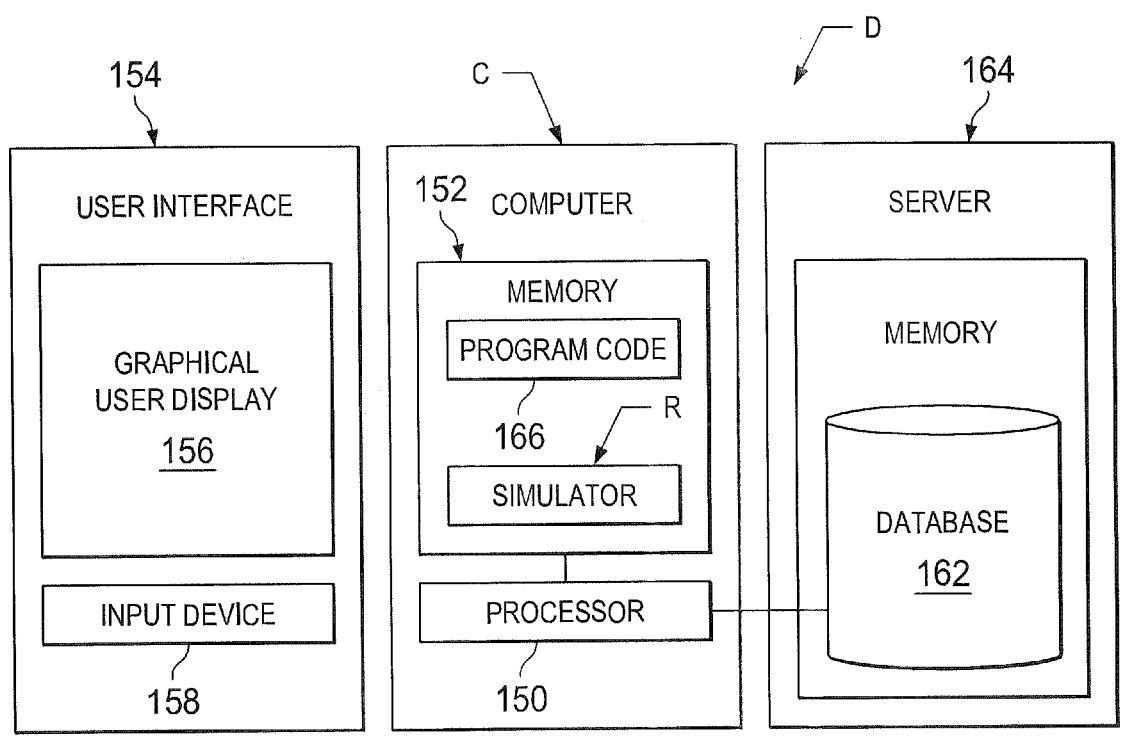
FIG. 11 is a schematic block diagram of a data processing system for two dimensional reservoir pressure estimation with integrated static bottom-hole pressure survey data and simulation modeling according to the present invention.

As illustrated in FIG. 11, the data processing system 1) according to the present invention includes a computer C having a processor 150 and memory 152 coupled to the processor 100 to store operating instructions, control information and database records therein. The data processing system D can be a computer of any conventional type of suitable processing capacity, such as a mainframe, a personal computer, laptop computer, or any other suitable processing apparatus. It should thus be understood that a number of commercially available data processing systems and types of computers may be used for this purpose. As indicated, the data processing system also operates as a reservoir simulator R for simulation of performance and for forecasting of production from the reservoir M. The simulator may thus be of the type described and shown in U.S. Pat. No. 7,526,418.

The computer C has a user interface 154 and an output data display 156 for displaying output data or records of three-dimensional reservoir pressure deter using real time pressure data from downhole gauges according to the present invention. The output display 156 includes components such as a printer and an output display screen capable of providing printed output information or visible displays in the form of graphs, data sheets, graphical images, data plots and the like as output records or images.

The user interface 154 of data processing system D also includes a suitable user input device or input/output control unit 158 to provide a user access to control or access information and database records and operate the computer C. Data processing system D further includes a database 160 stored in computer memory, which may be internal memory 152, or an external, networked, or non-networked memory as indicated at 162 in an associated database server 164.

The data processing system D includes program code 166 stored in non-transitory form in memory 152 of the computer C. The program code 166 according to the present invention is in the form of non-transitory computer operable instructions causing the data processor 100 to perform the computer implemented method of the present invention in the manner described above and illustrated in FIG. 3.

It should be noted that program code 166 may be in the form of microcode, programs, routines, or symbolic computer operable languages that provide a specific set of ordered operations that control the functioning of the data processing system D and direct its operation. The instructions of program code 166 may be stored in non-transitory form in memory 152 of the computer C, or on computer diskette, magnetic tape, conventional hard disk drive, electronic read-only memory, optical storage device, or other appropriate non-transitory data storage device having a computer usable medium stored thereon. Program code 166 may also be contained on a data storage device such as server 164 as a non-transitory computer readable medium.

With the present invention, Bottom-Hole Pressure (SBHP) or pressure survey data measured at or near the depth of a producing formation interval data is entered and honored at the well locations with respect to the desired reference datum depth. Establishing the wells SBHP pressures as control points, the 3-dimensional pressure between the wells is estimated based on results of the numerical simulation by reservoir simulator R based on governing equations and relationships representing actual thermodynamics and geophysics, as well as the most updated geological realization of the subsurface reservoir illustrated as model M. The present invention reduces turnaround time for generation of maps and quality checking the data contents displayed in the maps and stored in the data processing system for evaluation of further processing or analysis.

The integration between the SBHP pressure points and simulation pressure results in a 3D grid populated with estimated reservoir pressure based on appropriate reliability and conformance with statistical quality analysis and control methods (such as Distance-Weighted Moving Average or DWMA). The data processing system D then adjusts the pressure values to the datum reference depth, if needed. Several alternative methods are then available for collapsing the 3-dimensional pressure grid array into a single layer (2-dimensional) while also taking into account geological features, aerial and vertical heterogeneity, and numerical model constraints. The resultant product, a 2-dimensional isobaric map of a reservoir region of interest is the provided and made available to a variety of visualization and quality control tools for reservoir management engineers to utilize.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined methodology, or in the performance of the same, requires the claimed matter in the following claims; such techniques and procedures shall be covered within the scope of the invention.

It should be noted and understood that there can be improvements and modifications made of the present invention described in detail above without departing from the spirit or scope of the invention as set forth in the accompanying claims.

What is claimed is:

1. A computer implemented method of forming a two-dimensional pressure map with a data processing system of reservoir pressures in a region of interest in a subsurface hydrocarbon producing reservoir, the reservoir being partitioned for modeling purposes into a reservoir model as an array of a grid of cells extending over the three dimensions of the reservoir, the reservoir having a plurality of wells with perforations for passage of a multiple phase fluid from the reservoir into the wells, with selected ones of the wells having downhole pressure measurement systems installed therein, the array of a grid of cells of the reservoir model comprising well cells at the locations of the wells and reservoir cells at the remaining cells of the grid, the data processing system comprising a processor, a memory, a display and a reservoir simulator, the method comprising the computer processing steps of:
storing in the memory computer operable instructions causing the data processing system to form the two-dimensional pressure map of reservoir pressures in the region of interest;
performing in the data processing system under control of the stored computer operable instructions the steps of:
(a) receiving in the data processing system provided pressure measurements from the downhole pressure measurement systems located in the wells;
(b) determining in the reservoir simulator simulated pressures for the well cells of the reservoir model;
(c) determining with the processor reservoir pressures of well cells at uppermost perforations of each of the wells as control points in the reservoir model based on the provided pressure measurements from the downhole pressure measurement systems and based on the determined simulated pressures for the well cells;
(d) computing with the processor pressures for well cells below the uppermost perforations and reservoir cells of the reservoir model based on the determined reservoir pressures to form a three-dimensional grid pressure array for the reservoir model;
(e) reducing the formed three-dimensional grid pressure array for the reservoir model with the processor to form a two-dimensional layer of pressure values for the reservoir model;
(f) assembling in the memory of the data processing system the two-dimensional layer of pressure values for the reservoir model; and
(g) forming with the display an output image map of the two-dimensional layer of pressure values for the reservoir model adjusted to indicate pressure changes extending over the reservoir during production due to geology and fluid dynamics.

2. The computer implemented method of claim 1, further including the step of performing digital filtering of the computed pressures for the well cells of the reservoir model.

3. The computer implemented method of claim 2, wherein the digital filtering performed comprises digital weighted moving average filtering of the computed pressures.

4. The computer implemented method of claim 1, wherein the step of computing with the processor pressures for the well cells below the uppermost perforations is performed by determining pressures from the uppermost perforations successively to lower perforations for the cells of a well.

5. The computer implemented method of claim 1, wherein the step of computing with the processor pressures for the well cells below the uppermost perforations is performed by determining an average pressure for a column in the reservoir model containing the well perforations.

6. The computer implemented method of claim 1, wherein the step of computing with the processor pressures for the well cells below the uppermost perforations is performed by determining pressures from the uppermost perforations successively to lower perforations for a column in the reservoir model containing the well perforations.

7. The computer implemented method of claim 1, wherein the step of reducing the three-dimensional grid pressure array to a two-dimensional layer of pressures for the reservoir model is performed by pore-volume weighted averaging of the computed pressures for the cells of the reservoir model.

8. The computer implemented method of claim 1, wherein:
the step of determining with the processor reservoir pressures of well cells at uppermost perforations further comprises determining well pressure gradients between perforations in the wells; and
the step of computing with the processor pressures for well cells further comprises computing with the processor pressure gradients below the uppermost perforations and reservoir cells of the reservoir model based on the determined well pressure gradients to form a three-dimensional grid pressure array for the reservoir model.

9. The computer implemented method of claim 1, wherein the step of determining with the processor reservoir pressures of well cells further comprises:
performing in the processor a geostatistical interpolation of pressure in the cells extending over the array of cells of the reservoir model based on the obtained pressure measurements from the pressure measurement systems and based on the determined simulated pressures for the well cells.

* * * * *